May 1, 1945.  A. O. WILLIAMS  2,374,909
BRAKE APPLYING MEANS
Filed Nov. 13, 1943
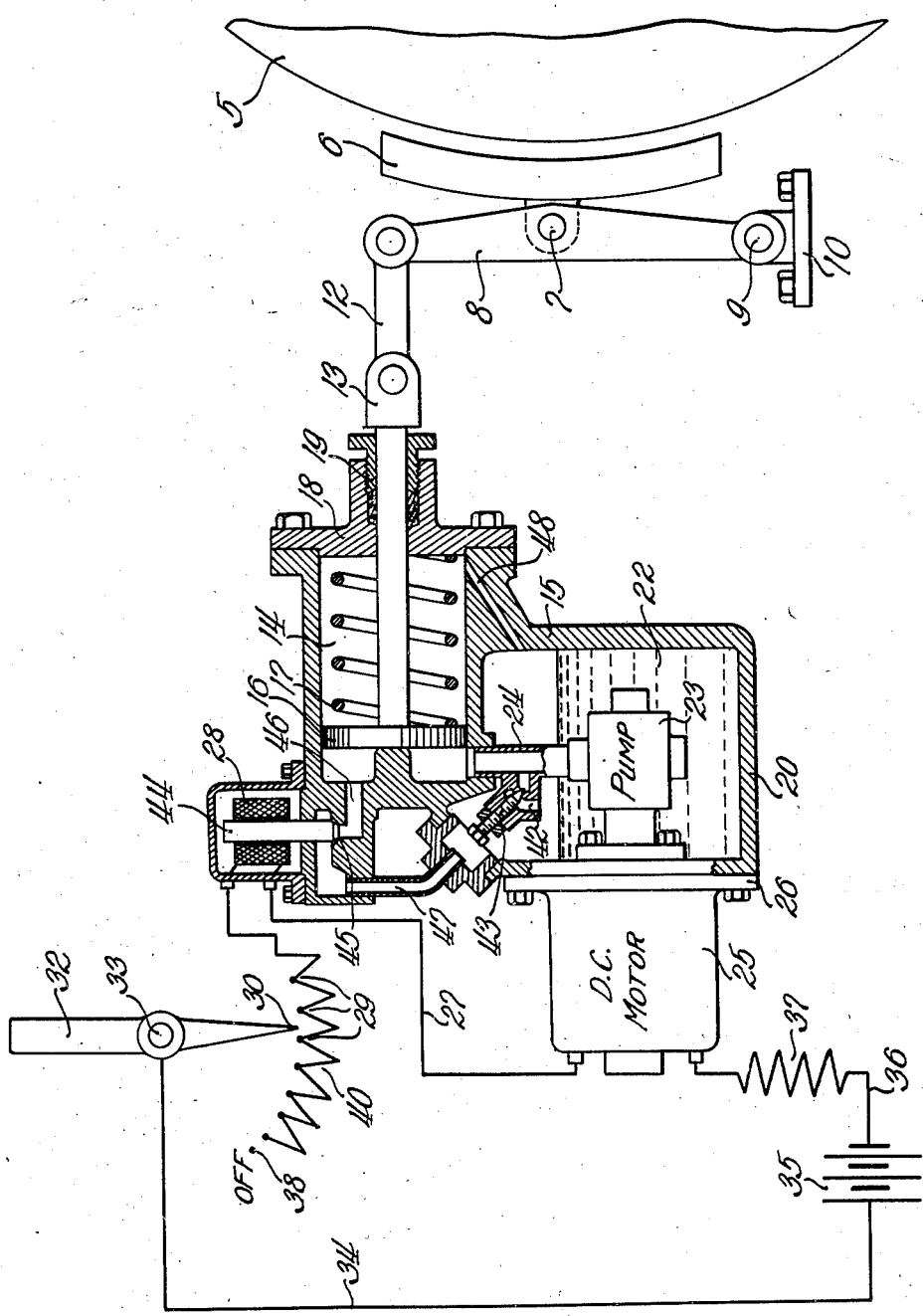
INVENTOR.
Alfred O. Williams
BY Walter E. Schinner
ATT'Y Patented May 1, 1945

2,374,909

UNITED STATES PATENT OFFICE 2,374,909

BRAKE APPLYING MEANS

Alfred O. Williams, Battle Creek, Mich., assignor to Clark Equipment Company, Buchanan, Mich., a corporation of Michigan Application November 13, 1943, Serial No. 510,224

3 Claims. (Cl. 188—153)

This invention relates to brake applying means, and more particularly is concerned with electrically controlled means for applying a brake to a revolving member such as a drum, the tread of a rail car wheel, or the like.

The primary object of the present invention is to provide means for controlling the amount of pressure to be applied by the brake from zero to the highest maximum pressure desired.

In former rail car tread brakes and similar constructions, the design has always been such that the brake was either fully off or fully on, and the operator had no control over the rate of application of the brake or the amount of pressure or braking action desired. The present invention therefore contemplates a design in which the brake can be gradually applied to the braking surface under the control of the operator and can be quickly released from any braking action by the operator.

In a preferred form of the present invention this is accomplished by the use of a motor driven pump, the pressure developed by the pump being in direct proportion to the speed of the motor and the motor speed being controlled manually by the operator.

Another advantage of the present invention is the simplicity of construction and the fact that the mechanism can be mounted in any convenient place on the rail truck or undercarriage of the vehicle and may be operated from any remotely disposed point.

Other objects and advantages of the present invention will appear more fully from the following detailed description which, taken in conjunction with the accompanying drawing, will disclose to those skilled in the art the particular construction and operation of a preferred form of the present invention.

The drawing is an elevational view, partly in section, of one embodiment of the present invention.

Referring now in detail to the drawing, there is shown a revolving brake surface 5, which may be a drum or can be the tread of a rail car wheel or the like.

Mounted in position to engage the annular surface of the member 5 is a brake shoe 6, pivotally mounted as at 7 upon a brake applying arm 8. The arm 8 is pivotally supported on its lower end on the pivot 9, which is anchored into position by the member 10. At its upper end the arm 8 has the link 12 pivotally connected thereto, which link 12 at its opposite end is connected to the rod 13 extending into the piston chamber 14 formed in the body member 15. Within the chamber 14 the rod 13 is provided with an enlarged head or piston 16 operating within the cylindrical chamber 14 and normally held in the position shown by means of the coiled spring 17. The end of the chamber 14 is closed by a cap member 18 which is provided with a suitable packing gland 19 for preventing loss of fluid along the surface of the rod 13 where it projects from the piston body.

The lower part of the body member 15 is provided with a sump 20 within which is disposed fluid 22, such as oil or the like. Mounted in the sump 20 is a pump member 23 which is preferably disposed below the level of the oil 22 and has an outlet 24 leading up to the forward end of the cylinder 14. The pump 23 is of the rotary type and is driven by means of a suitable direct current electric motor 25, secured as by the flange 26 to the side wall of the sump 20.

The motor has one of its terminals connected through the conductor 27 and the coil 28 to a series of taps 29 forming a selective resistance coil adapted to be engaged by the contact end 30 of a manually operated control lever 32 which is pivotally mounted as at 33. The control lever 32 is connected in the motor circuit through the conductor 34 to one side of a battery 35, the opposite side of the battery being connected through conductor 36 and fixed resistance 37 to the opposite terminal of the motor 25.

In the construction as thus far described, the operator moves the control lever 32 from the off position indicated at 38 along the various taps 29 of the variable resistance 40. As the tip of the lever 32 contacts the respective taps, moving in a counterclockwise direction, the speed of the motor is progressively increased. This results in increased speed of rotation of the pump 23 and thus increases the pressure developed by the pump, which is transmitted through the outlet 24 to the head of the piston 16, thereby moving the piston against the spring pressure to apply the brake 6 against the braking surface 5. Thus the operator has selective control of the amount of pressure which he desires to apply against the braking surface 5.

Upon returning of the control lever 32 to its off position, the pump stops and the pressure in the head end of the cylinder 14 against the piston 16 is dissipated through the metering orifice 42, controlled by the needle valve 43; however, it is desirable that in some cases the pressure be released quickly and for this reason, I have provided the coil 28 in the motor circuit, which coil is in the form of a solenoid, having the armature 44 which, whenever the coil is energized, is held firmly against seat 45 formed in the outlet passage-way 46. Thus this passage-way 46 is closed against the escape of fluid when the coil 28 is energized, but when the coil is de-energized, the fluid pressure upon the end of the armature forces the armature upwardly to provide a quick release thereof through the passage-way 46 and the return conduit 47 into the sump 20 of the body member 15. The armature 44 also provides means for preventing too high a pressure being developed within the cylinder 14, acting in this manner as a safety release valve. This can be controlled by the windings of the solenoid to determine at which point the armature will be forced upwardly in spite of the holding action of the coil 28.

Preferably a return port 48 is provided for return of fluid which has passed by the piston 16 in the chamber 14, the port 48 draining from the outlet end of 14 back into the sump 20.

Due to the characteristics of a direct current motor in which the speed is directly controlled by the potential impressed thereon, it is obvious that the pressure developed by the pump 23 can be controlled accurately by varying the resistance 40. This is done by the means of a control lever so that varying amounts of fluid pressure can be developed whereby the operator can accurately control the amount of pressure by the brake shoe 6 against the braking surface 5.

While it is apparent that, if so desired, the solenoid 28 and armature 44 could be eliminated and the entire return of fluid be controlled through the metering orifice 32, it is desirable in certain circumstances to provide for quick release of the brakes and this can be readily accomplished by the use of the solenoid controlled relief valve.

It is therefore believed apparent that I have provided a simplified type of brake control for applying brakes in a vehicle which is of sturdy design and is easily controlled. I am aware that certain changes may be made in details of the present construction and I, therefore, do not intend to be limited except as defined by the scope and spirit of the appended claims.

I claim:

1. In combination, a fluid controlled piston, brake means actuated thereby, a fluid pump of the positive displacement type, a variable speed motor for driving said pump to produce a predetermined fluid pressure against said piston, a control circuit for said motor, a solenoid in said circuit, a valve normally held closed by said solenoid, subject to said fluid pressure and providing for quick release thereof when said motor circuit is deenergized.

2. The combination of claim 1 including a metering relase valve for said fluid pressure operating independently of said quick release valve.

3. In combination, a fluid reservoir having a cylinder formed therein above the fluid level, a brake-actuating piston in said cylinder, a pump in said reservoir below the fluid level and having its pressure side connected to said cylinder, a passageway from said cylinder back into said reservoir, a valve in said passageway subject to fluid pressure in said cylinder, a solenoid coil adapted to hold said valve closed when energized, a motor for driving said pump, and a control circuit for said motor and solenoid whereby upon opening of said circuit said valve releases the fluid under pressure in said cylinder.

ALFRED O. WILLIAMS.